(12) United States Patent  
Schütt

(10) Patent No.: US 6,416,120 B1  
(45) Date of Patent: Jul. 9, 2002

(54) DEVICE FOR INFLUENCING THE AIR FLOW IN THE AREA OF AN OPENABLE MOTOR VEHICLE ROOF

(75) Inventor: Thomas Schütt, Fürstenfeldbruck (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/714,795

(22) Filed: Nov. 17, 2000

(30) Foreign Application Priority Data

Nov. 18, 1999 (DE) .......................................... 199 55 712

(51) Int. Cl.[7] .................................................. B60J 7/22
(52) U.S. Cl. ...................................................... 296/217
(58) Field of Search ......................................... 296/217

(56) References Cited

U.S. PATENT DOCUMENTS 2,827,328 A    3/1958  O'Kane et al.
4,492,406 A  * 1/1985  Matsubara .................... 296/217
4,538,852 A  * 9/1985  Lobo et al. ................ 296/217 X
5,558,388 A  * 9/1996  Furst et al. ............... 296/222 X

FOREIGN PATENT DOCUMENTS

DE    39 13 567      10/1990
DE    42 39 428       3/1994
DE    195 20 348      8/1996
DE    197 34 249      2/1999

* cited by examiner

*Primary Examiner*—Dennis H. Pedder  
(74) *Attorney, Agent, or Firm*—Nixon Peabody LLP; David S. Safran

(57) ABSTRACT

In a device for influencing the air flow in the area of the roof opening of an openable motor vehicle roof (1) with at least one roof frame (7) which runs at least partially along the roof opening (2), at least one flat wind deflector (4, 5, 6) is located in the area of the front edge of the roof opening (2) which is movably guided in a direction essentially parallel to a surface of the wind deflector (4, 5, 6) in slide ways (20, 24) in or on the roof frame (7) which runs along the front edge of the roof opening (2) into and out of a receiving space (20).

20 Claims, 2 Drawing Sheets

DEVICE FOR INFLUENCING THE AIR FLOW IN THE AREA OF AN OPENABLE MOTOR VEHICLE ROOF

BACKGROUND OF THE INVENTION

1. Field of the Invention

The invention relates to a device for influencing the air flow in the area of the roof opening of an openable motor vehicle roof with at least one roof frame which runs at least partially along the roof opening, the device having at least one wind deflector which is located in the area of the front edge of the roof opening.

2. Description of Related Art

Devices of the type mentioned above are used both in motor vehicles with fixed roofs which have a roof opening which can be closed by means of a movable cover element and also in convertibles. They serve, on the one hand, to reduce the noise caused by the airstream within the passenger compartment, and on the other hand, to deflect the air flow rushing over the roof opening, and thus, protect the passengers from excess air flow.

Devices of the initially mentioned type are described, for example, in published German Patent Application No. DE 197 34 249 which relates especially to the prevention of air eddies in the passenger compartment of a convertible. It is proposed that the air flow streaming over the motor vehicle be raised by means of a wind deflector element which is seated on the top edge of the frame of the windshield or is hinged to it or which can be moved along the inside of the windshield. The wind deflector elements described in DE 197 34 249 are large-area elements which extend over a large part of the passenger compartment and can only be integrated into conventional roof structures with difficulty.

U.S. Pat. No. 2,827,328 likewise relates to wind deflectors for convertibles, proposes that a lever rod be housed in the front roof frame which runs along the top edge of the windshield with wind deflector elements being attached to the lever rod. The shape of the wind deflector elements corresponds to the contour of the roof frame and they can be set between a position of non-use, in which the wind deflector elements flushly adjoin the surface of the roof frame, and a position of use in which the wind deflectors are raised parallel to the surface of the roof frame. This embodiment of a wind deflector arrangement causes a rather complex configuration of both the roof frame itself and also the entire wind deflector mechanism, and moreover, is disadvantageous in that both the shape of the wind deflector and also its alignment in the position of use are dictated by the shape of the roof frame.

Furthermore, published German Patent Application No. DE 39 13 567 discloses a wind deflector for a sliding roof or a sliding and lifting roof which extends essentially over the entire width of the roof opening, and is pivotably mounted in the front area of the roof frame. To reduce noise development when driving with the sliding roof or sliding and lifting roof open, it is proposed that the wind deflector be provided with additional air guide elements which are located on the wind deflector and which can be moved parallel to its plane. Actuation of the additional air guide elements is produced via rod and pinion arrangements which are located in the roof frame, and to actuate the wind deflector itself a coupling rod, which is housed in a lateral roof frame, laterally engages the wind deflector. The wind deflector shown in DE 39 13 567 requires considerable installation space and is entirely unsuited for use in convertibles due to the coupling rod which is housed in the side roof frame.

SUMMARY OF THE INVENTION

Accordingly, a primary object of this invention is to devise a device for influencing the air flow in the area of the roof opening of an openable motor vehicle roof which does not require a complex mechanism for its activation and which requires only a small installation space, so that it can be used in all types of roofs, especially in convertible roofs.

This object is achieved in a device of the initially mentioned type in that the wind deflector is movable guided in slide ways in the direction essentially parallel to the surface of the wind deflector, and there is a receiving frame, in or on the roof frame which runs along the front edge of the roof opening, in which the wind deflector can be at least partially retracted and extended.

By guiding the wind deflector in slide ways, a complex adjustment mechanism, as is necessary in the prior art, is entirely avoided. When the wind deflector is not being used, it is retracted directly into the receiving space, actuated by the closing roof part, and the receiving space can be provided in the front roof frame itself or on the roof frame, for example, in a lining on the side of the roof frame which faces the vehicle interior. The wind deflector device proposed here requires very little installation space and is also especially suitable for use in convertibles in which there is little space for housing and actuating such a wind deflector device.

In accordance with one embodiment, a pre-tensioning arrangement is provided in order to pretension the wind deflector in a direction toward its extended position. The pre-tensioning arrangement can be especially a spring arrangement which pushes it out of the receiving space when the wind deflector is released.

Furthermore, the wind deflector can be curved in the lengthwise direction, i.e., in the lengthwise direction of the motor vehicle, on the one hand, to allow the wind deflector to adapt to special aerodynamic requirements, and on the other hand, to be able to match the wind deflector to the local circumstances of its accommodation in a manner which saves as much space as possible. In this case, the slide ways for guiding the wind deflector are curved, preferably according to the curvature of the wind deflector.

The slide ways can be on the one hand slide rails in which or on which the wind deflector is guided. However, according to one preferred embodiment of the invention, the slide ways are formed by the receiving space itself, simplifying the structure of the device even further and in addition making it possible to save additional installation space.

The receiving space for accommodating the wind deflector can be formed by the roof frame so that, when the wind deflector is retracted, it is inserted into the roof frame itself, or the roof frame can be provided with a lining, and in this case, there can be a receiving space between the roof frame and the lining.

The device can be devised such that the wind deflector is automatically extended as soon as a roof element which closes the roof opening is opened, and the wind deflector is retracted automatically into the receiving space when the roof element is closed. However, there can also be a displacement arrangement for moving the wind deflector into or out of the accommodation space so that the user of the vehicle can influence the air flow streaming over the vehicle as desired.

There can also be several wind deflectors, for example, when the accommodation space is formed by the roof frame itself and the roof frame, for static reasons, is divided into several segments, or to be able to adapt the air flow streaming over the vehicle more individually to the requirements of the vehicle passengers.

In another embodiment of the invention, in a motor vehicle roof with a roof opening provided in the fixed roof surface, with a roof frame which runs at least partially along the roof opening, with a roof element for closing and at least partially exposing the roof opening and a device for influencing the air flow in the area of the roof opening which has at least one wind deflector which is located in the area of the front edge of the roof opening, the wind deflector is movably guided in a direction essentially parallel to the surface of the wind deflector in slide ways which are located essentially in the direction of the closing motion of the roof element, and there being a receiving space, in or on the roof frame which runs along the front edge of the roof opening, in which the wind deflector can be at least partially retracted and extended. By aligning the slide ways in the closing direction of the roof element, when the roof element is being closed, a force is exerted in the direction of the slide ways so that the wind deflector is automatically retracted when the roof element is being closed.

The invention is explained in greater detail below with reference to the accompanying drawings.

DETAIL DESCRIPTION OF THE INVENTION

Figure 1:
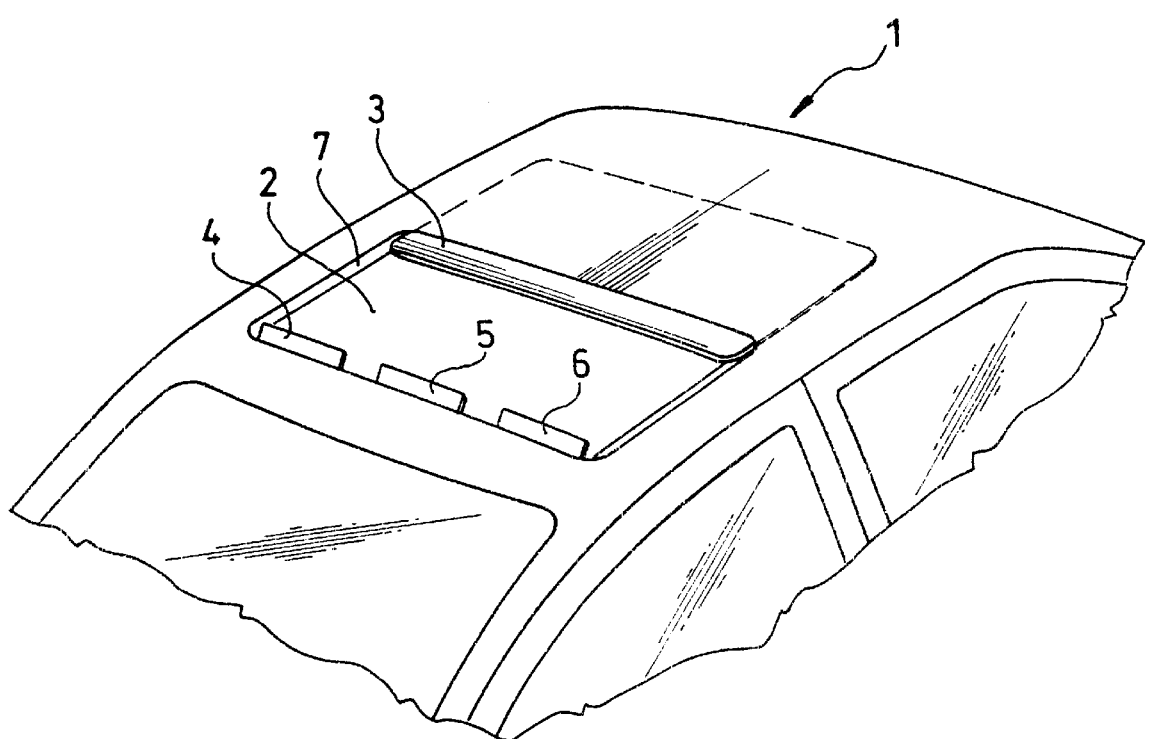
FIG. 1 is a schematic perspective representation of a motor vehicle roof with an opened cover.

A motor vehicle roof 1 (see FIG. 1) has a roof opening 2 which can be selectively closed or at least partially exposed by means of a slidable cover 3. FIG. 1 shows the cover 3 in its lowered position pushed to the rear under the fixed vehicle roof 1. In the area of the front edge of the sliding roof opening 2, several wind deflectors 4, 5, and 6 are arranged next to one another extending crosswise of the vehicle roof 1. A roof frame 7 surrounds the roof opening 2.

Figure 2:
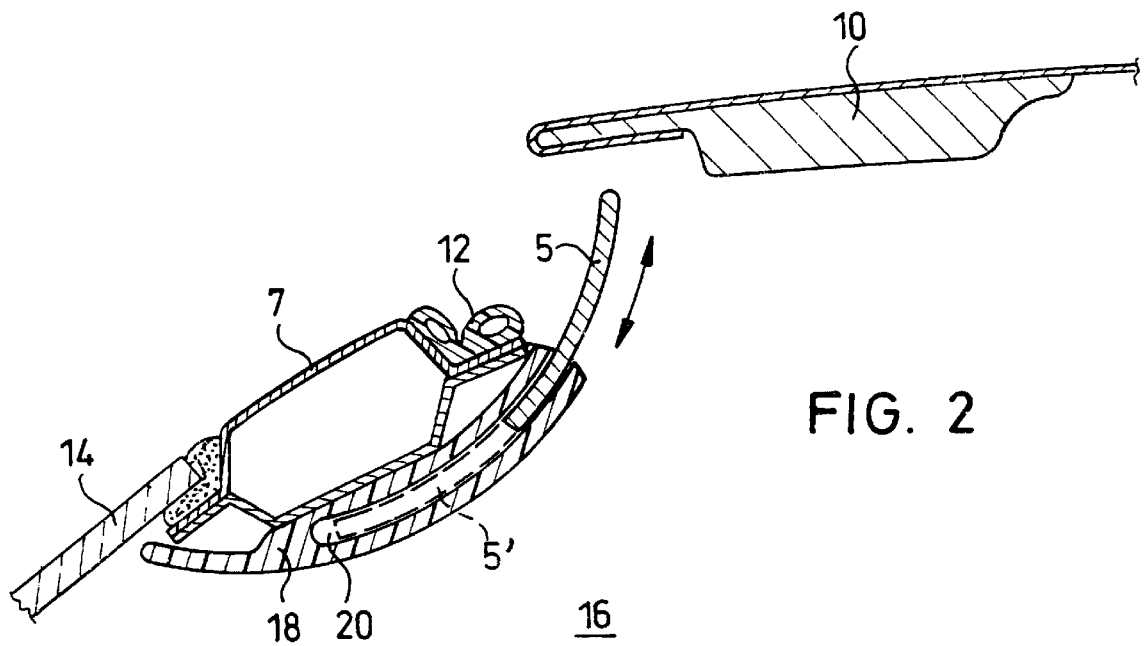
FIG. 2 is a sectional view of the area of the front edge of the roof opening.

As shown in FIG. 2, the roof shown that of a convertible in which the front part of the roof element 10, when the roof is being closed, moves obliquely downward onto a seal 12 that is attached to the front part of the roof frame 7 and is held pressed against it by means of a locking mechanism (not shown). The roof frame 7 against which the top edge of the front window 14 rests is lined relative to the motor vehicle interior 16 by a lining 18. Between the roof frame 7 and the lining 18, or as shown in FIG. 2, in the lining 18, there is a receiving space 20 for the wind deflector 5. The receiving space 20 has a curved shape which matches the shape of the lining 18 which, in turn, is matched to the run of the roof frame 7. Thus, for the wind deflector 5, both in the vertical direction and also in the lengthwise direction of the motor vehicle hardly any additional space is needed. FIG. 2 shows the wind deflector 5 in its extended position in solid lines, while the broken contour line labeled with reference number 5' shows the wind deflector 5 in its retracted position. In the embodiment as shown in FIG. 2, the wind deflector 5 is guided directly in the receiving space 20 so that separate slide rails are not necessary. Furthermore, the slide ways formed by the receiving space 20 for the wind deflector 5 are aligned such that the displacement direction of the wind deflector 5 is essentially in the closing direction of the roof element 10. If the roof element 10 is closed by moving downward, it directly, i.e., without the interposition of any raising or lowering mechanism, presses the wind deflector 5 into the receiving space 20. As is furthermore shown in FIG. 2, the wind deflector 5 is curved in the lengthwise direction; on the one hand, this is used to optimize the direction of motion of the wind deflector relative to the roof element 10, and by which, on the other hand, the installation space 20 needed for the receiving space 20 is minimized.

Figure 3:
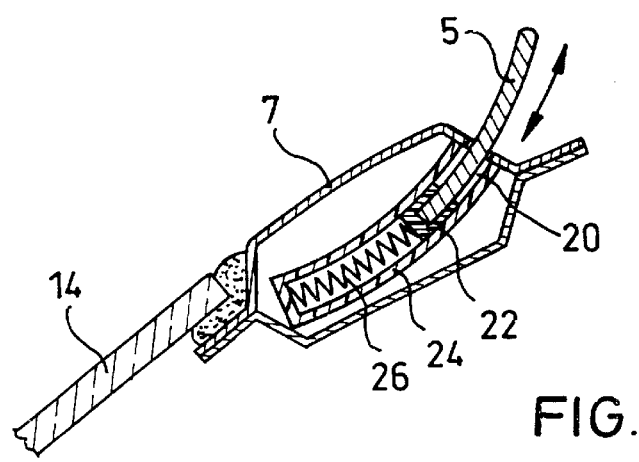
FIG. 3 is a view similar to FIG. 2, but showing a modified embodiment.

FIG. 3 shows a modified embodiment of the above described device without the roof element 10. In the configuration shown in FIG. 3, the receiving space 20 for the wind deflector 5 is in the roof frame 7. The wind deflector 5 is guided in a slide rail 24 by means of guide shoes 22, of which, FIG. 3 shows only one, and is pre-tensioned in a direction toward the extended position by means of a spring arrangement 26. The use of a pre-tensioning arrangement 26 is especially advantageous in the embodiments of the device described here, in which the wind deflector 5 is always to be extended when the roof is opened and the wind deflector 5 is to be actuated by the cover 3 or the roof element 10. However, there can also be a separate displacement arrangement in order to move the wind deflector 5 into or out of the receiving space 20 under operator control.

The above described concept is especially suited for use in convertibles in which, generally, there is little space on the roof frame 7 which surrounds the top edge of the windshield and in which the adjustment mechanism for the wind deflector cannot be accommodated laterally in the roof frame as in sliding roofs or sliding and lifting roofs. In addition, in convertibles, the direction of motion of the front cross hoop located on the convertible top during closing is favorable for retraction of the wind deflector since this roof element 10 in swings obliquely relative to the roof frame 7, and thus, can retract the wind deflector directly, i.e., without interposition of any raising or lowering mechanism. As a result of the simplicity of the arrangement and the small required installation space required, the device described here is also advantageous in motor vehicles with fixed roofs.

What is claimed is:

1. Device for influencing air flow in an area of a roof opening of an openable motor vehicle roof, the device comprising a roof frame that is adapted to be mounted in a roof opening with a front edge of the roof frame in an area of a front edge of the roof opening in an installed state of the device, at least one wind deflector which is located in an area of a front edge of the roof frame, the at least one wind deflector being movably guided, essentially parallel to a surface of the wind deflector, in a direction of extension and retraction, into and out of a fixed receiving space at the roof frame; wherein the wind deflector is curved in said direction of extension and retraction.

2. Device as claimed in claim 1, further comprising a pre-tensioning arrangement which pretensions the at least one wind deflector in a direction toward an extended position.

3. Device as claimed in claim 1, wherein there are a plurality of wind deflectors.

4. Device as claimed in claim 1, wherein the at least one wind deflector is movably guided in slide ways that are curved in accordance with the curvature of the wind deflector.

5. Device as claimed in claim 1, wherein the at least one wind deflector is movably guided by surfaces defining the receiving space.

6. Device as claimed in claim 1, wherein the receiving space is formed in the roof frame.

7. Device as claimed in claim 1, wherein the roof frame is provided with a lining and the receiving space is formed in said lining.

8. Device as claimed in claim 1, wherein an displacement arrangement is provided for moving the at least one wind deflector into or out of the receiving space.

9. Motor vehicle roof with a roof opening provided in a fixed roof surface, a roof frame which runs at least partially along the roof opening, and at least one wind deflector which is located in an area of a front edge of the roof opening, the at least one wind deflector being movably guided, essentially parallel to a surface of the wind deflector, in a direction of extension and retraction, into and out of a fixed receiving space at the roof frame; wherein the wind deflector is curved in said direction of extension and retraction.

10. Device as claimed in claim 9, further comprising a pre-tensioning arrangement which pretensions the at least one wind deflector in a direction toward an extended position.

11. Device as claimed in claim 9, wherein the at least one wind deflector is movably guided in slide ways that are curved in accordance with the curvature of the wind deflector.

12. Device as claimed in claim 9, wherein the at least one wind deflector is movably guided by surfaces defining the receiving space.

13. Device as claimed in claim 9, wherein the receiving space is formed in the roof frame.

14. Device as claimed in claim 9, wherein the roof frame is provided with a lining and the receiving space is formed in said lining.

15. Convertible vehicle having a roof frame which runs along a top edge of a front windshield, and at least one wind deflector which is located in an area of the top edge of the front windshield, the at least one wind deflector being movably guided, essentially parallel to a surface of the wind deflector, in a direction of extension and retraction, into and out of a fixed receiving space at the roof frame; wherein the wind deflector is curved in said direction of extension and retraction.

16. Device as claimed in claim 15, further comprising a pre-tensioning arrangement which pretensions the at least one wind deflector in a direction toward an extended position.

17. Device as claimed in claim 15, wherein the at least one wind deflector is movably guided in slide ways that are curved in accordance with the curvature of the wind deflector.

18. Device as claimed in claim 15, wherein the at least one wind deflector is movably guided by surfaces defining the receiving space.

19. Device as claimed in claim 15, wherein the receiving space is formed in the roof frame.

20. Device as claimed in claim 15, wherein the roof frame is provided with a lining and the receiving space is formed in said lining.

* * * * *